June 10, 1924. 1,497,588
A. RATH
GEAR CUTTING MACHINE
Filed Oct. 23, 1922   10 Sheets-Sheet 1

Inventor.
Albert Rath.
By [signature], Atty.

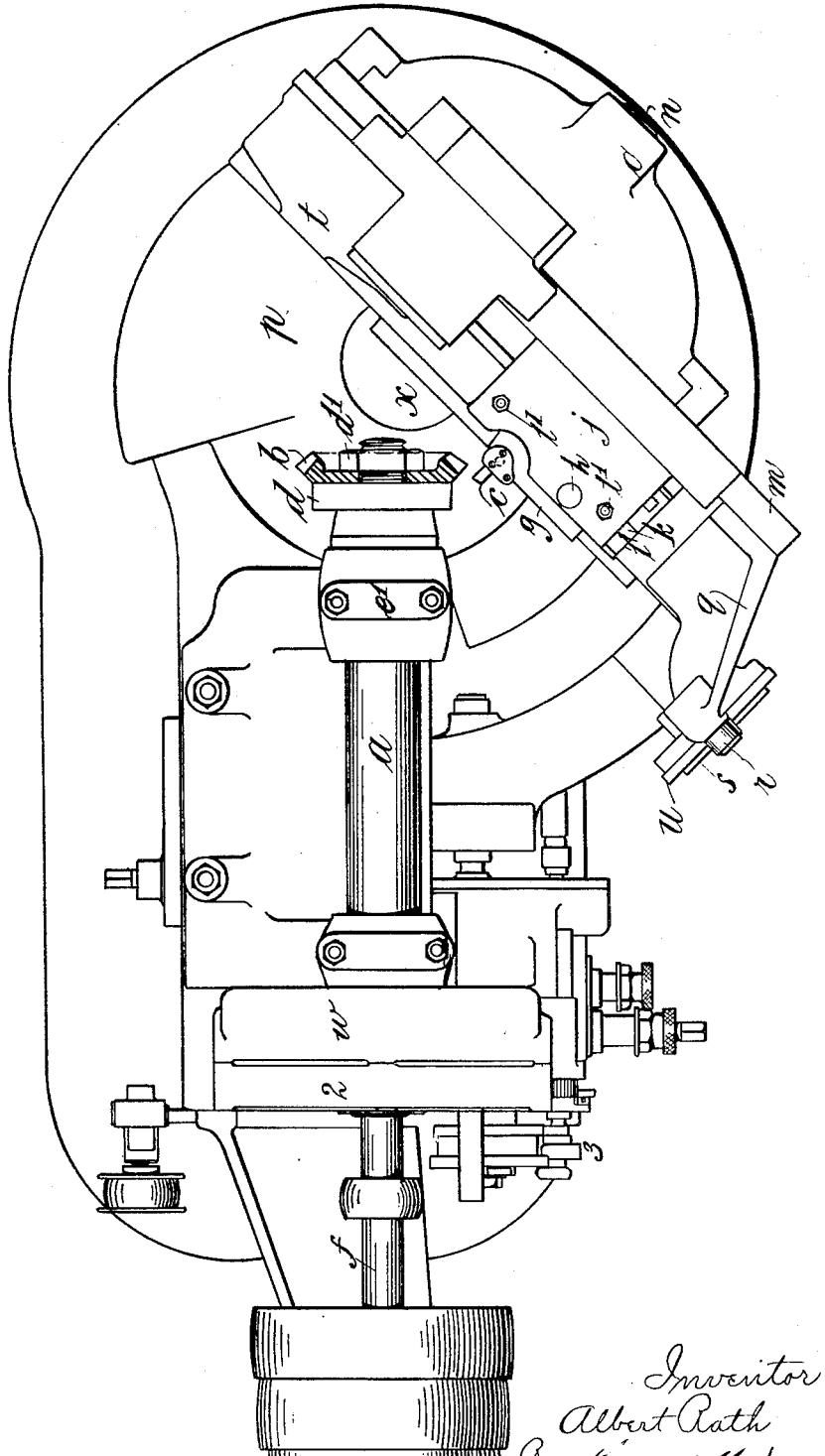

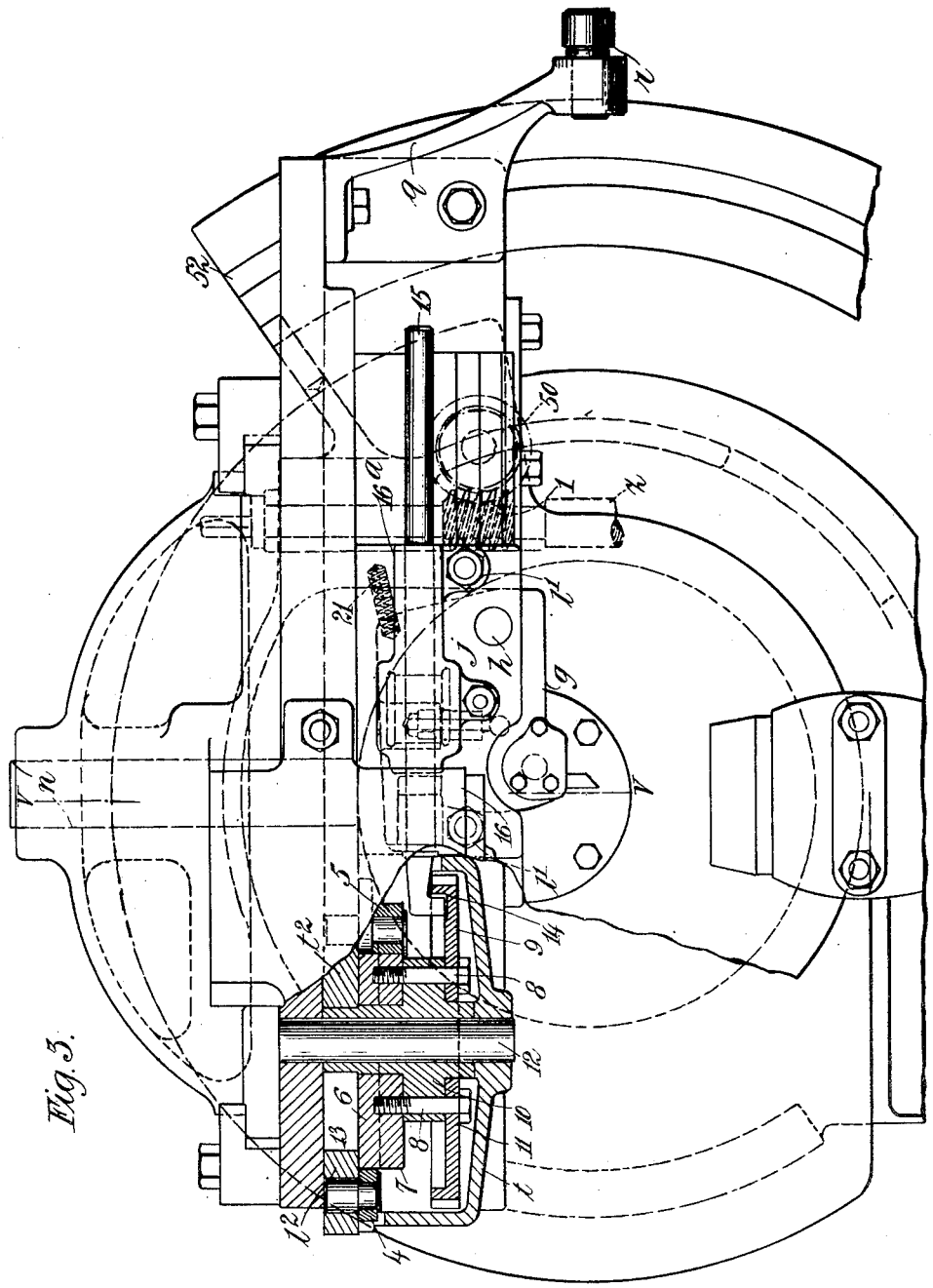

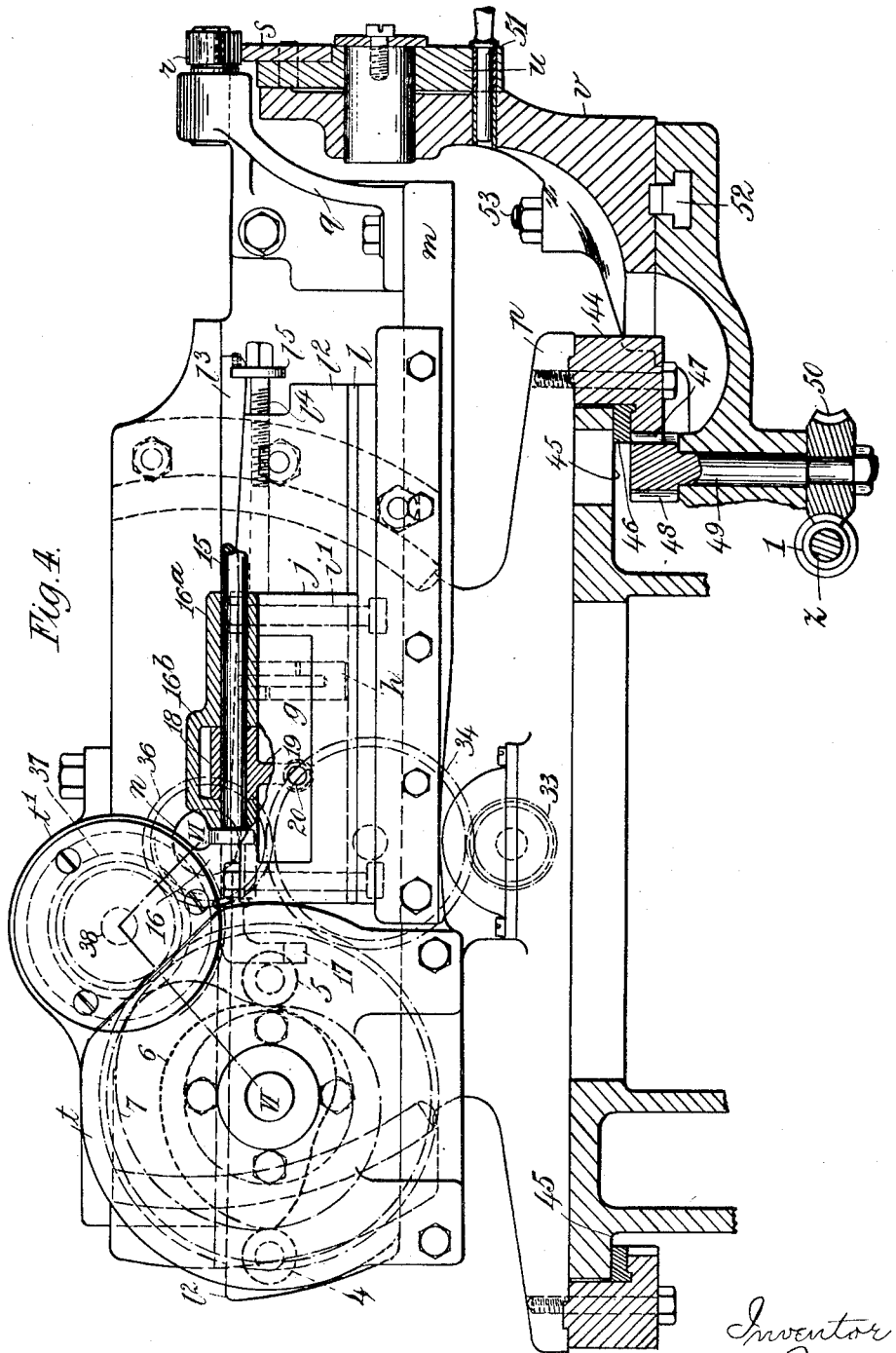

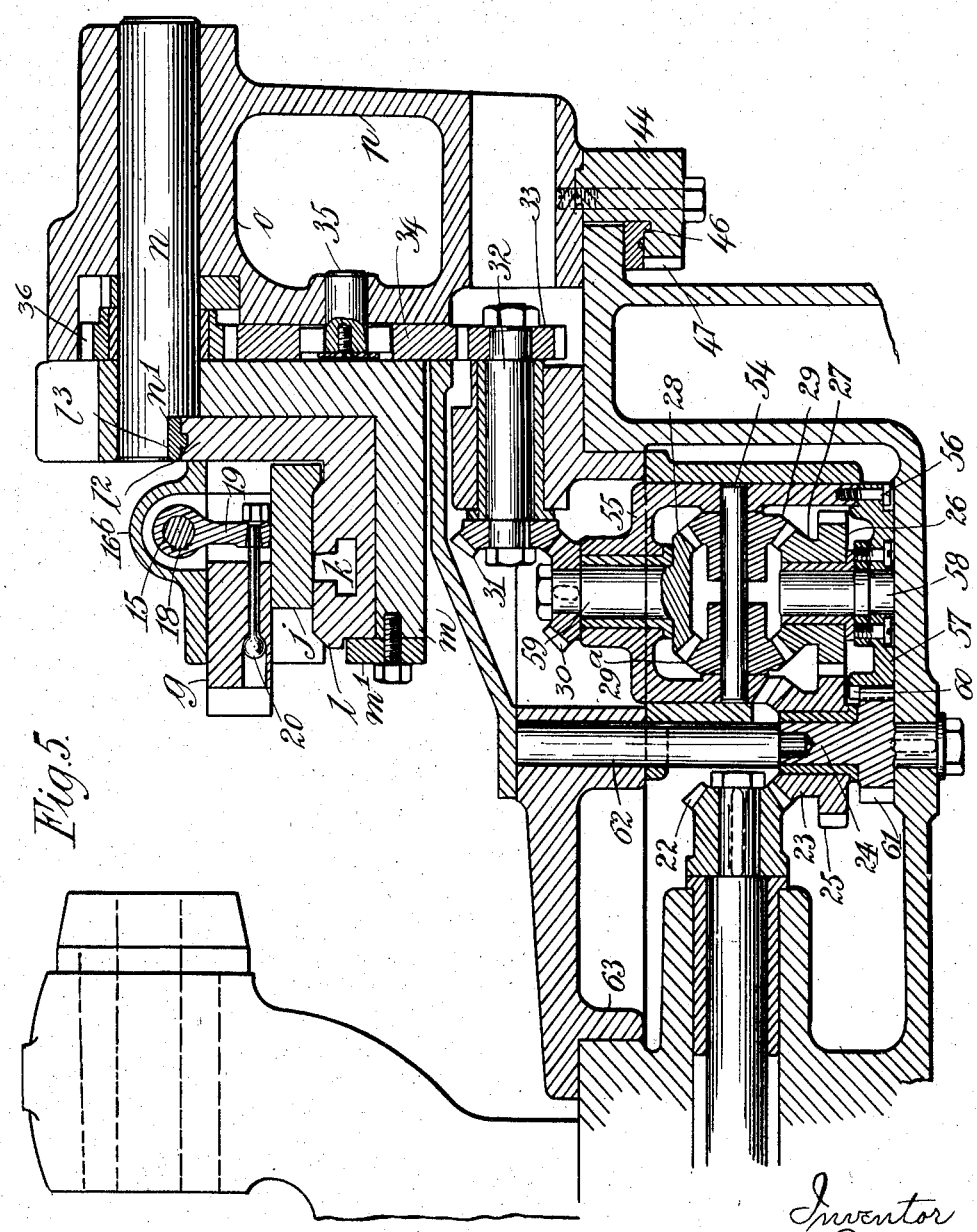

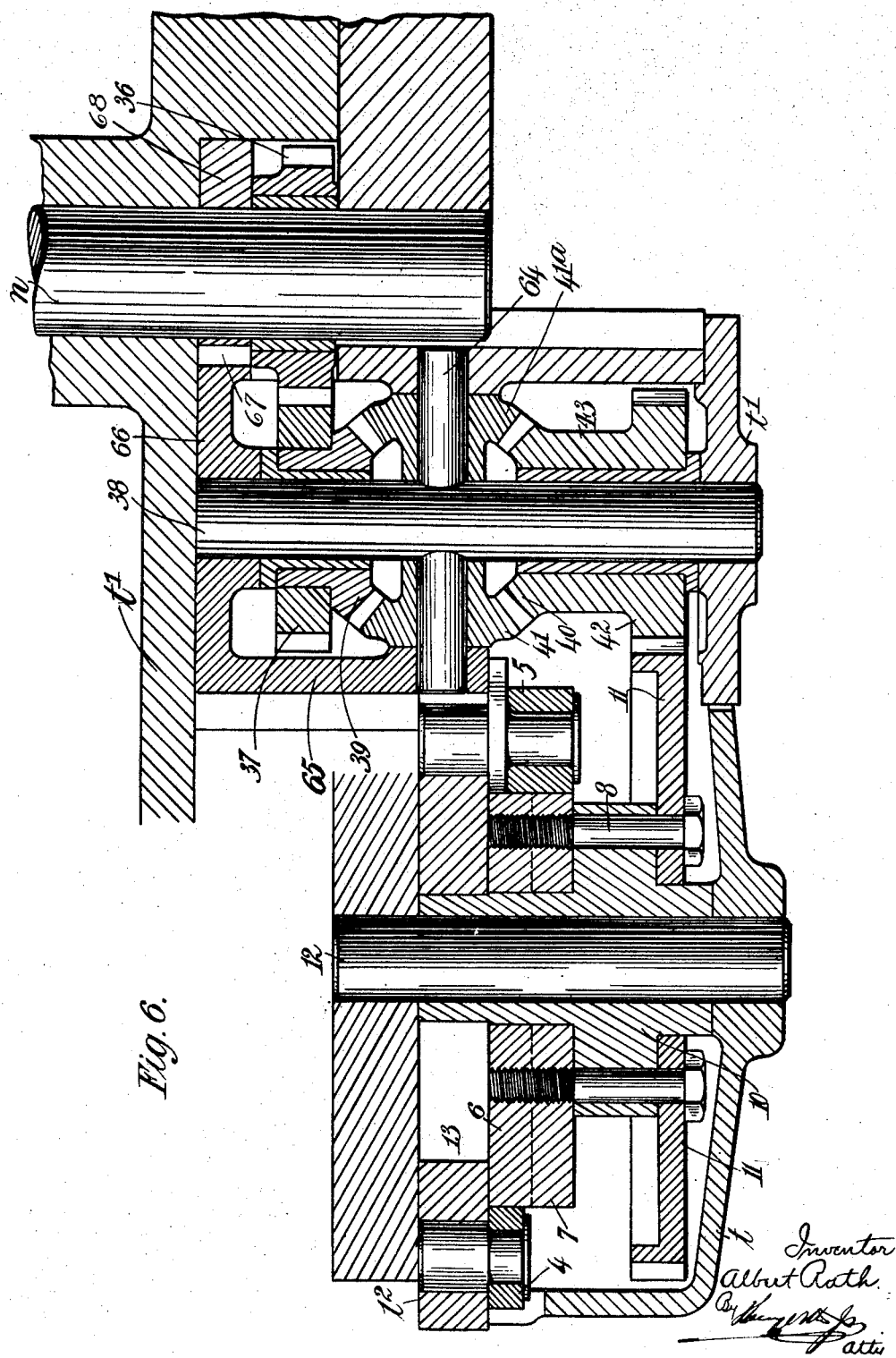

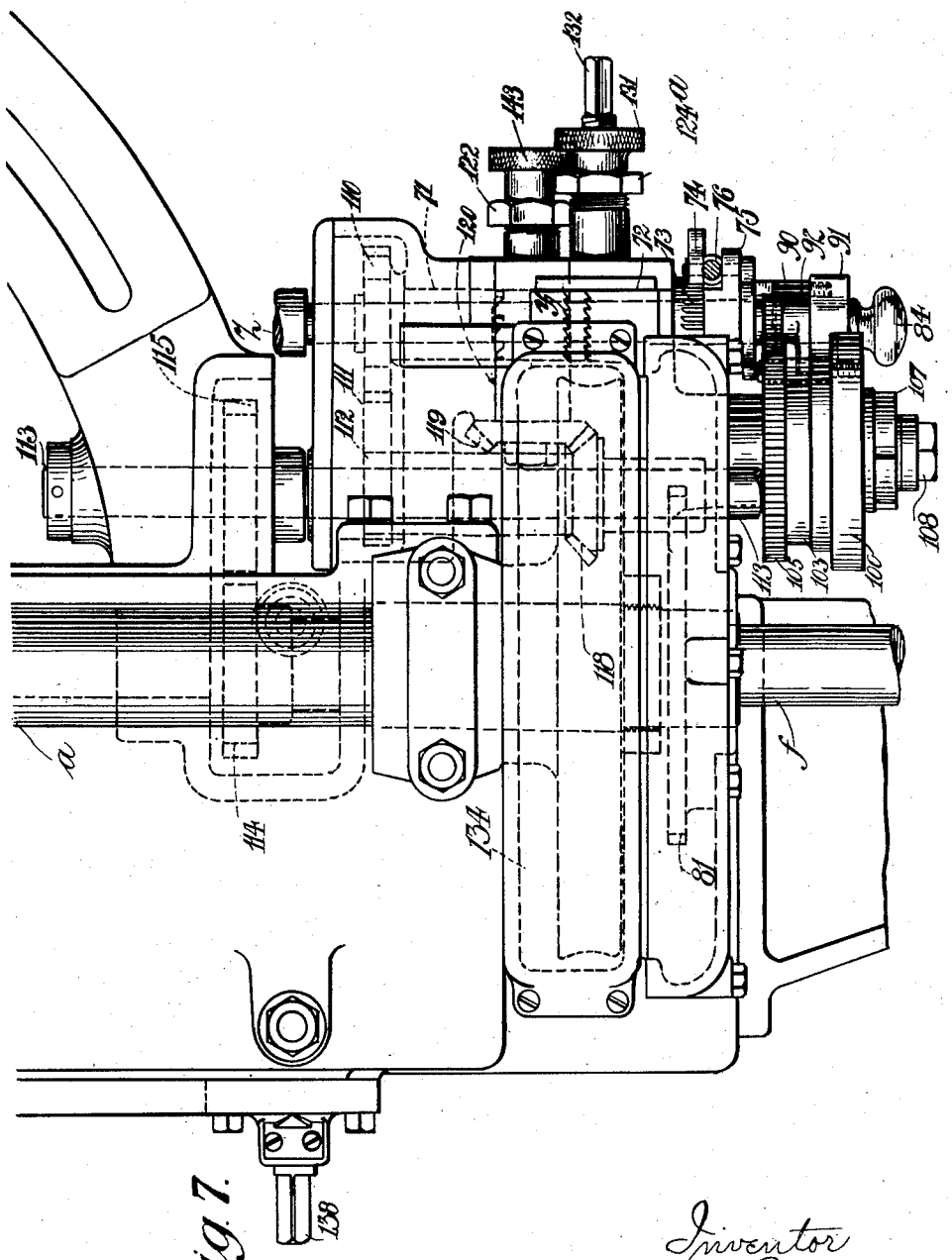

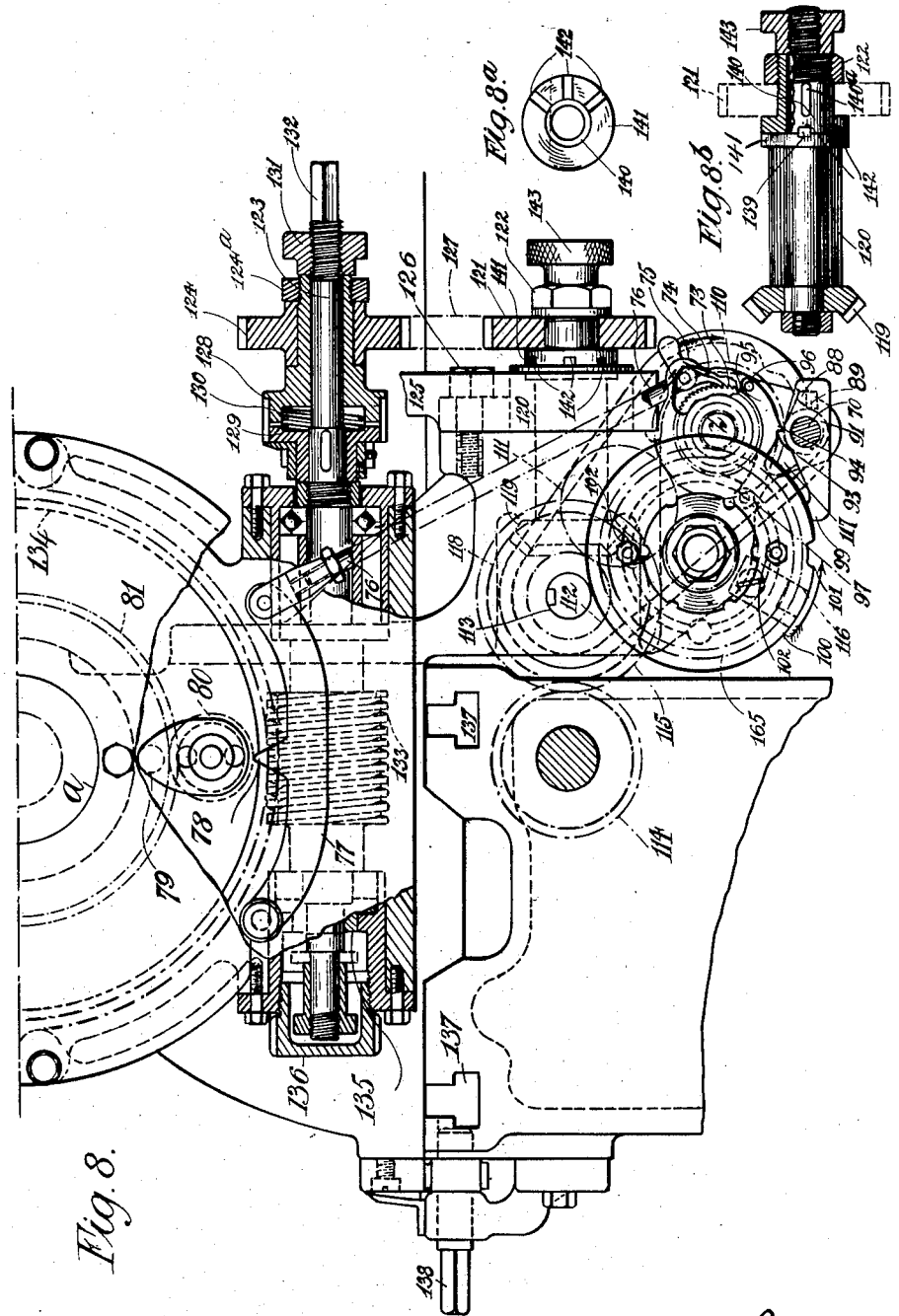

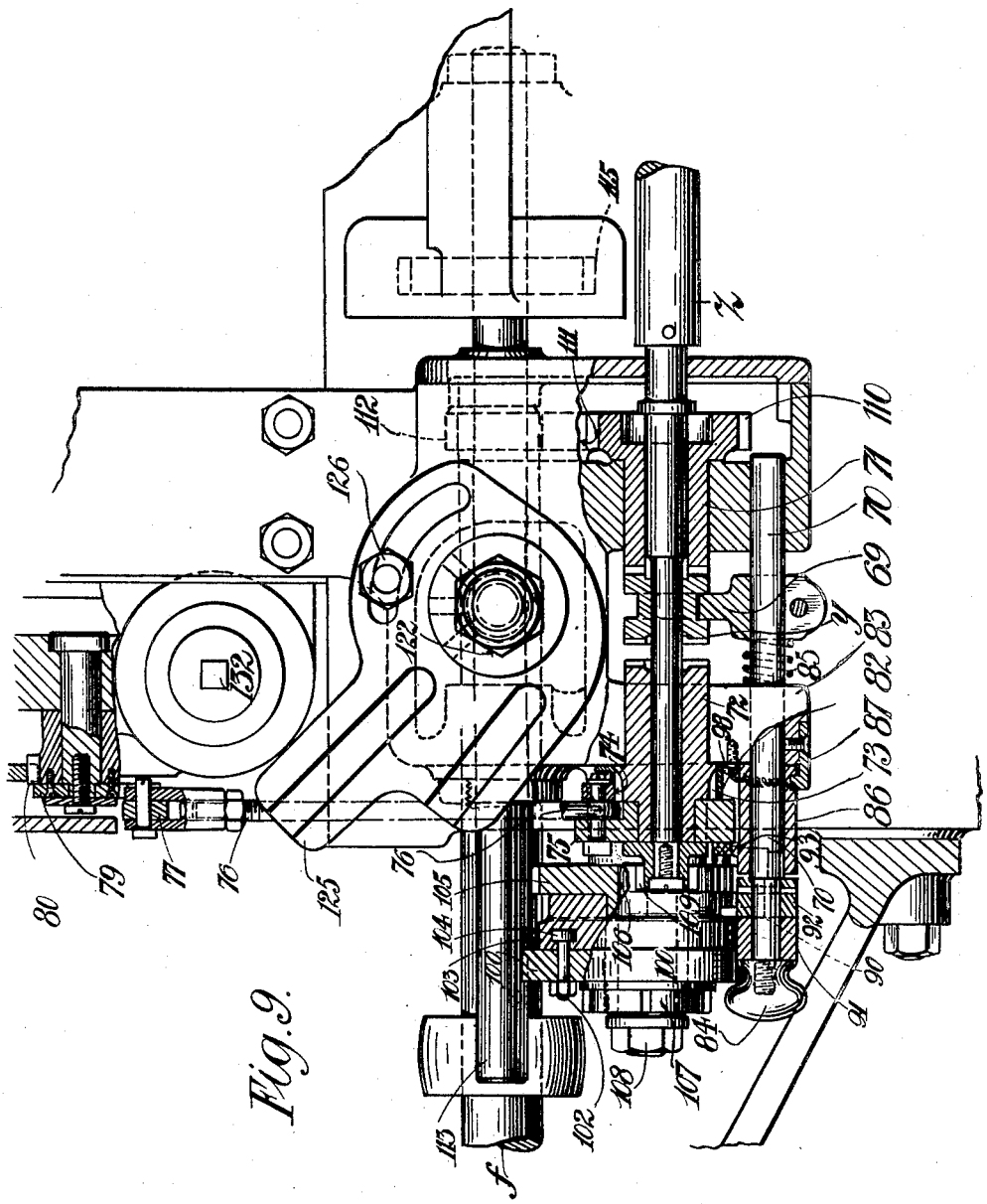

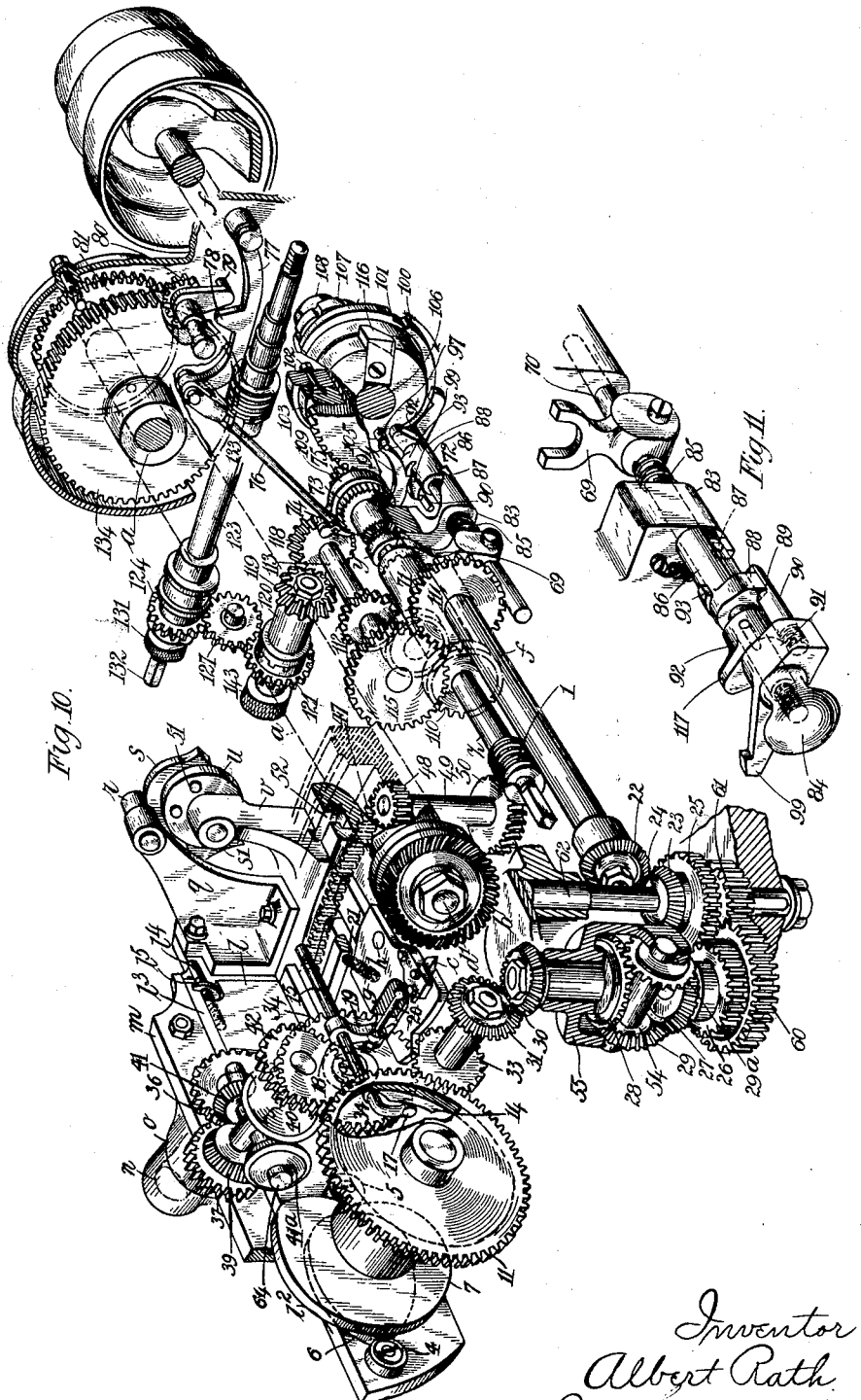

Patented June 10, 1924.

1,497,588

UNITED STATES PATENT OFFICE.

ALBERT RATH, OF LONDON, ENGLAND, ASSIGNOR, BY DIRECT AND MESNE ASSIGNMENTS, OF FOUR-FIFTEENTHS TO GWYNNES ENGINEERING COMPANY, LIMITED, OF LONDON, ENGLAND, A CORPORATION OF GREAT BRITAIN, FOUR-FIFTEENTHS TO GWYNNES LIMITED, OF LONDON, ENGLAND, A CORPORATION OF GREAT BRITAIN, AND TWO-FIFTEENTHS TO WILLIAM CANNELL, OF OXFORD, ENGLAND.

GEAR-CUTTING MACHINE.

Application filed October 23, 1922. Serial No. 596,251.

*To all whom it may concern:*

Be it known that I, ALBERT RATH, a subject of the King of Great Britain, residing at Crown Motor Works, Crown Street, Acton, London, England, have invented certain new and useful Improvements in Gear-Cutting Machines, of which the following is a specification.

This invention comprises improvements in gear cutting machines and in particular machines for cutting spiral tooth bevel gears.

The principal object of the present invention is to provide a machine capable of cutting spiral tooth bevel gears with greater accuracy and efficiency than heretofore.

According to this invention, the gear blank is continuously rotated, and the tool is reciprocated on a straight line running to the cone centre of the gear, the tool being operated on its cutting stroke by a spiral cam and timed so that it is given a cutting stroke, and is withdrawn and returned to the position for commencing a fresh cut while the continuously rotating blank turns through the appropriate angle for bringing a fresh tooth into the path of the advancing tool.

The rotation of the blank during the advance of the tool along its cutting stroke produces the desired spiral formation of the teeth cut in this machine, and the direction of the spiral is determined by the direction of rotation of the blank.

Preferably, the blank is driven at such a speed as to turn through an angle equal to two tooth divisions, whilst the tool is completing one complete reciprocatory movement.

Thus, in cutting a gear having an odd number of teeth, every other tooth will receive the same cut during a first revolution of the blank and then the teeth alternating with the cut teeth will receive that same cut during the second revolution of the blank. In this case, the tool may be automatically fed to a fresh cut at the end of every second revolution of the blank, that is to say when all teeth have received the same cut. In the case of cutting a gear having an even number of teeth and with the blank turning through two tooth divisions during each complete reciprocation of the tool, every other tooth will have received the same cut at the end of every revolution, and the tool may be fed to a fresh cut at the end of every revolution. In this case, one half of the teeth of the gear will be eventually finished whilst the alternate teeth remain uncut. The blank may then be indexed to the extent of one tooth division, whereupon the cutting operations on alternate teeth may proceed and eventually the whole of the teeth will be finished. However, if desired, the blank may be indexed to the extent of one tooth after every revolution and the feed of the tool may take place at the end of every second revolution.

The tool is advantageously reciprocated by means of cams designed so that the tool is cutting during the turning of the blank through one and one third tooth divisions and is withdrawing and returning to the following cut during turning through two thirds of a tooth division. The teeth cut would then have an overlap of about one third. Other proportions of overlap, however, may be provided for by suitably designing the cams and calculating the ratio between the speed of rotation of the blank and the reciprocation of the tool slide due to the operation of such cams. Naturally, the cams may be replaceable or interchangeable to enable different cams to be substituted for controlling the tool in the machining of gear faces of different widths.

The cams for operating the tool slide as aforesaid are preferably designed with a uniformly increasing spiral in the cutting control part and this part is made of a somewhat greater amplitude than is actually required for cutting the width of gear face on a given blank. In this way, it is possible to avoid the necessity for accurate endwise setting of the tool when changing from the machining of one gear to the machining of its mating gear. Also, the spiral struck on one of two mating gears must be of the same character, although reverse to the spiral struck on the other of such gears.

The shaping of the teeth is controlled, in known manner, by two formers, one for each side of the teeth, these formers acting upon the pivotally mounted carrier of the tool slide and altering the position of the tool, each time that tool feed takes place, in accordance with the shape desired. These formers may be mounted in known manner on a revoluble holder, so that a desired former can be turned into operative position, as required.

The control of the feed at the conclusion of each revolution, or of each alternate revolution, of the blank may be performed by a cam mounted on the rim of the division or indexing wheel and connected with a pinion having a planetary motion around a fixed gear. This cam may be geared so as to come to the same operative position at every second revolution of the index or division wheel, or it can be geared or duplicated to bring about a feed at every revolution of the index or division wheel.

All movements of the tool must be along lines directed to the cone centre of the gear to be cut, and the position of the tool relatively to the blank at the commencement of any reciprocation, must be the same and must not be affected or altered by feed of the turret or by the adjustment of the tool by the former which takes place simultaneously with the said feed.

Consequently, these improvements provide compensating gears which operate during the said feed and adjustment to prevent the latter from altering the accurate setting of the tool. Otherwise, an alteration in the setting or relative disposition of the tool would result in the striking of a different spiral at different points between the lip or face and root of a tooth. The compensating gears advantageously take the form of differential mechanisms introduced at the axis of revolution of the turret and at the pivot of the tool slide carrier, and these mechanisms produce an equal and opposite adjustment of the tool, in regard to its approach towards the blank, to that which is produced by the taking place of the two pivotal adjustments aforesaid.

The invention comprises subsidiary novel features designed for contributing to the practical carrying out of the principal features. For example, such subsidiary features include mechanism for operating the feed and for rendering it inoperative when the cutting operations on a blank are completed, and means for facilitating the setting of the blank in relation to the tool for the production of different kinds of teeth, all as will be hereinafter fully described with reference to the accompanying drawings, in which:—

Figure 2 is a plan of Figure 1, but with the turret head turned to a working position.

Figure 3 is a plan, partly in horizontal section and to a larger scale, of the turret and tool-operating mechanism seen to the right hand of Figures 1 and 2, but in this figure the turret head is shown after being turned to an extreme position in which the tool slide is at right angles to the axis of the work spindle, as in Figure 1.

Figure 4 is a sectional elevation as seen from the left hand side of Figure 3.

Figure 5 is a central vertical section through the turret and turret head, that is to say a section on the line V—V of Figure 3, the section through the tool slide, however, is taken a little to one side of the line V—V of Figure 3 in order to show the means for operating the tool holder to withdraw the tool.

Figure 6 is a developed plan section taken on the line VI—VI of Figure 4, but drawn to a different scale.

Figure 7 is a plan of the headstock of the machine to a larger scale than Figure 2.

Figure 8 is an end elevation of the headstock, as seen from the left-hand side of Figure 7, certain of the parts being shown in vertical section.

Figure 1:
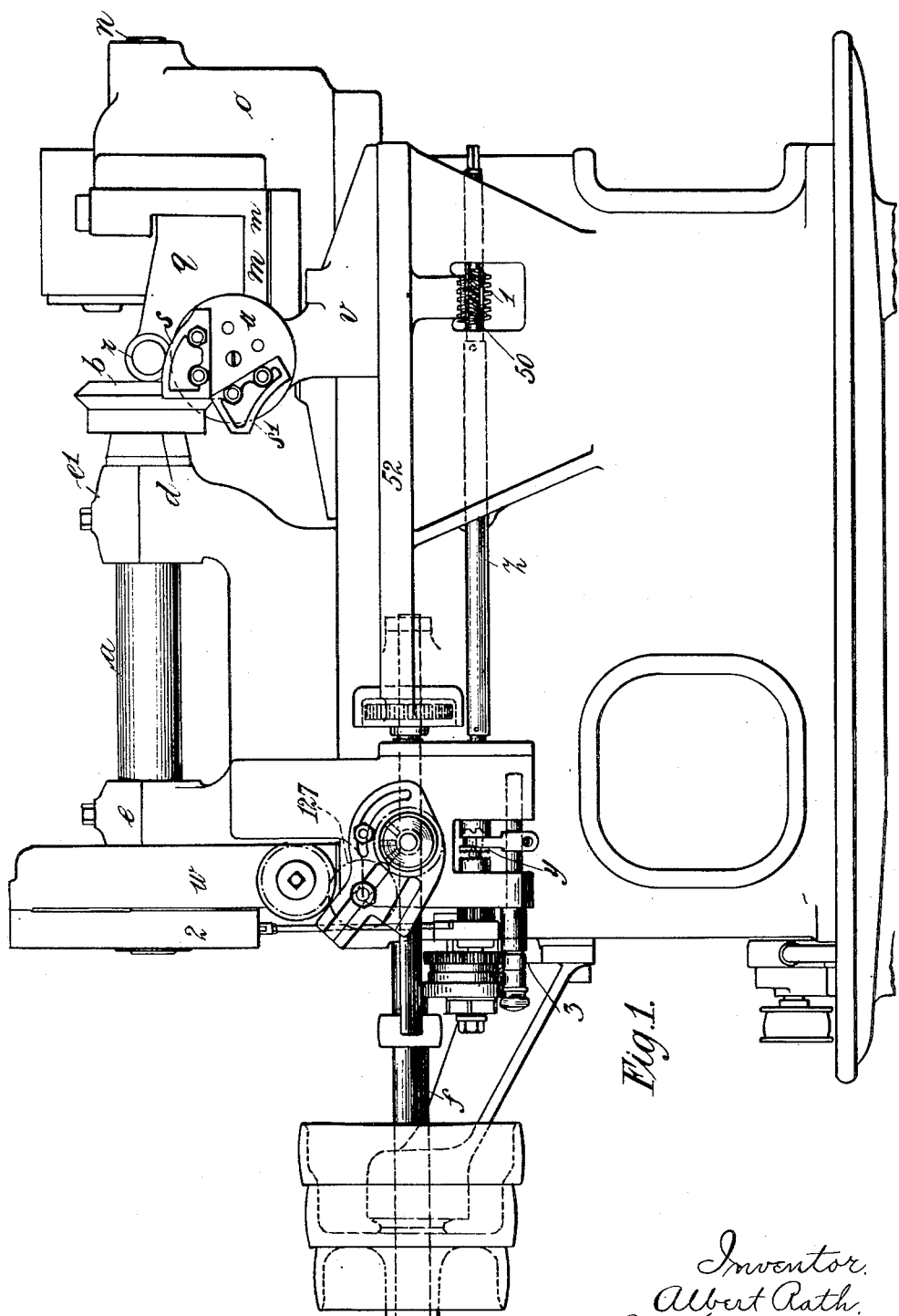
Figure 1 is a front elevation of a spiral tooth bevel gear cutting machine constructed in accordance with these improvements, but the turret head in this figure is shown turned to such a position as to bring the formers or contour cams in front of the reader.

Figure 8$^a$ is an elevation of a notched flange 141 seen in Figure 8.

Figure 8$^b$ is a sectional view of a detail seen in Figure 8 and including the notched disc 141.

Figure 9 is a sectional front elevation of a portion of the headstock, this view being to a larger scale than Figure 1.

Figure 10 is a pictorial view of the principal mechanisms removed from the framing, and as seen from the back of the machine. This view, which is intended to aid an understanding of the operations of these mechanisms, is more or less schematic in character and does not purport to illustrate the true relations of the parts, which may be ascertained from the preceding figures. For example, the cutting tool is not shown in proper relation with the blank, the tool operating mechanism being seen in a position in which it is most convenient to pictorially represent it.

Figure 11 is a view similar to Figure 10 of the automatic mechanism for releasing the feed clutch.

Referring to Figures 1, 2 and 10 of the drawings, $a$ is the work spindle upon which is mounted the blank $b$ to be cut by the cutter $c$. The blank $b$ is secured to the spindle by any suitable means, as by any chuck device $d$ fitted with securing nut $d'$. The spindle $a$ is supported in bearings $e$ $e'$ and is continuously revolved through the medium of a transmission, hereinafter described, between the driving shaft $f$ and the work spindle $a$. The tool or cutter $c$ is secured on a holder $g$, the latter being in the form of a plate mounted to turn about a pivot $h$ on a slide rest $j$ adjustable in guides $k$ in a reciprocatory slide $l$, all as will be hereinafter described. The slide $l$ is carried in guides by a pivotal support $m$ mounted by means of a horizontal pivot $n$ in a pivot bearing $o$ carried by the revolubly adjustable turret head $p$ in the manner hereinafter described. The pivotal support $m$ is provided with an arm $q$ fitted with an anti-friction roller $r$ for rolling upon a contour cam or former $s$ fixedly supported upon the turret base as hereinafter described.

In Figure 2, $x$ is a point which represents the apex or cone centre of an bevel gear to be cut on the blank $b$. This centre point $x$ is immediately above the central axis around which the turret head turns: it is also always opposite the axis of the pivot $n$, and it is always the point towards which the point of the cutter $c$ must move when making a cut. As the cutter $c$ moves along a rectilinear path, which latter, if produced, would intersect the point $x$, and makes a cut upon the rotating blank $b$, it follows that the said cut will be a spiral, the nature of which will depend upon the relative speeds of the blank $b$ and cutter $c$. Preferably, the driving transmissions, hereinafter described, are such as to cause the blank $b$ to turn through an angle equal to that of two teeth during a cutting and return stroke of the cutter $c$. Also the cutting stroke of the cutter $c$ is advantageously made during the turning of the blank $b$ through an angle equal to that of one and a third teeth, the withdrawal of the cutter $c$ from the work, its return stroke and reapproach to the work, being effected during the turning through an angle equal to that of two thirds of a tooth. In this way, the spiral teeth cut on the blank $b$ would have about what is known as a third overlap, but this proportion of overlap may be varied by suitably designing or changing the transmission, as will be readily understood.

The slide $j$ is reciprocated, for producing the cutting and return strokes of the cutter $c$, by means of mechanism contained in the casing $t$, Figure 2, and hereinafter described. When every tooth, or every alternate tooth, as the case may be, of the blank $b$, has received the same cut, the turret is automatically fed through a small angle to cause the cutter $c$ to enter more deeply between the teeth of the blank in order to make a new cut farther from the tips of the teeth. During such feed, the roller $r$ rides on the former $s$ and the contour of the latter adjusts the pivotal mounting $m$ about the pivot $n$ thereby adjusting the cutter in the vertical direction to produce the desired shaping of the teeth. In any state of adjustment, however, the point of the cutter $c$ will travel in a direct line towards the cone centre or apex $x$. The adjustment of a pivotal mounting by means of formers such as $s$ $s'$, see Figure 1, is known in bevel gear cutters, the two formers $s$ $s'$, one for one side of the teeth and the other for the opposite side, being mounted on a disc $u$, Figures 1, 4 and 10, revoluble on a pivot or stud on a bracket support $v$, so that either of the formers may be turned into the operative position. The bracket support $v$, is adjustable around the turret base and fixable in a position corresponding with any angular adjustment of the turret head, as will be explained.

In Figures 1 and 2, $w$ is a casing containing the indexing wheel for indexing the work. In Figure 1, $y$ is a clutch device for controlling the circular feed adjustment of the turret head, $z$ is the shaft controlled by the clutch $y$, and 1 is a worm on the shaft $z$ for feeding the turret head as hereinafter described. In Figures 1 and 2, moreover, 2 is a casing containing a striker mechanism for controlling the feed and 3 indicates generally a clutch-operating mechanism between the clutch $y$ and the mechanism in the casing 2, all as will be hereinafter fully described.

Referring to Figures 2, 3, 4 and 5, it will be seen that the slide rest $j$, which as stated above, is fitted with the vertical pivot $h$ for the tool holder $g$ to swivel about, may be clamped in the guide $k$ of the slide $l$ by means of the bolts $l'$ $l'$ Figures 2 and 4. The slide $l$ is formed with a vertical plate $l^2$ which extends forwardly into and through the casing $t$ of its operating mechanism, as will be seen from Figures 3, 4, 6 and 10. Figure 5 shows the slide $l$ and its plate $l^2$ slidably fitting in the angular formation of the pivotal mounting $m$, an outer retaining and guide strip $m'$ being bolted on to the mounting $m$ for engaging the outer side edge of the slide $l$. Figure 5 also shows that the extremity of the pivot $n$ is cut away at $n'$ to allow the top edge of the plate $l^2$ to pass. Between the top edge of the plate $l^2$ and the flat formed by cutting away the pivot $n$, a wear strip $l^3$ is inserted this strip $l^3$ being also interposed between the upper edge of the plate $l^2$ and the overhang of the mounting $m$, as is also seen in Figure 10. In order to adjust this strip $l^3$ into close sliding contact with the said flat and overhang, the lower and tongued edge of this strip is inclined so as to produce a taper as seen in Figure 4. By means of an adjusting screw $l^4$ screwing into the plate $l^2$ and engaging the strip $l^3$ by means of a flange $l^5$ on its head, the strip $l^3$ may be forced inwards between the top edge of the plate $l^2$ and the said surfaces above so as to tighten the sliding contact when the strip has become worn.

Upon the forward portion of the plate $l^2$, and within the casing $t$, there are mounted two anti-friction rollers 4 and 5 respectively (see Figures 3, 4, 6 and 10). The rollers 4 and 5 are suitably disposed so that the roller 4 engages the periphery of a cam 6 and the roller 5 engages the periphery of a cam 7. The contours of the cams 6, 7, which are of the snail variety, are seen in Figure 4, the larger cam 7 being indicated in chain line and the smaller cam 6 in thick dotted line. These cams, which may be formed from a single plate, as indicated in Figure 3, are secured by bolts 8 to the hub 10 of a toothed disc 11. The hub 10 revolves upon a pin 12 mounted in the casing $t$ and the plate $l^2$ is slotted at 13, Figures 3 and 6, so that it can reciprocate over the pin 12 and hub 10.

The cam 6 operates the roller 4 to produce the outward or cutting stroke of the plate $l^2$ and the tool slide attached thereto, and the cam 7 operates the roller 5 for the quick return. In Figures 4 and 10, the largest radius of the cam 6 is seen in contact with the roller 4 so that the plate $l^2$ is projected to the outward limit of the cutting stroke. Assuming the revolution of the cams 6, 7 to be clockwise, it will be seen that in less than a quarter of a revolution the smallest radius of the cam 6 will come into contact with the roller 4, and thereafter the increasing radius of the cam 6 will contact with the roller 4 to produce the cutting stroke in a little more than three quarters of a revolution. In Figures 4 and 10, also, the smallest radius of the cam 7 is seen in contact with the roller 5, and with clockwise revolution a little less than a quarter of a revolution will carry the lobe of the cam 7 past the roller 5 for performing the quick return of the plate $l^2$ and tool slide, as will be readily understood.

At the moment of the quick return taking place, the tool must be withdrawn laterally from the work, and this is accomplished by forming an inclined or cam face 14, Figures 3 and 10, on the inner surface of the toothed disc 11, for operating a simple mechanism as follows:—A rock shaft 15, Figures 4, 5, and 10, is mounted in a bearing 16 on the fixed framing and is prevented from moving endwise by suitable collars. This rock shaft 15 also extends through a sleeve 16$^a$ and housing 16$^b$ on the top of the slide rest $j$ and is of sufficient length for such sleeve 16$^a$ and housing 16$^b$ to slide to and fro on the rock shaft 15. At its forward end the rock shaft 15 has an arm 17 for engaging with the cam face 14. Within the housing 16$^b$ there is a sleeve 18 which is feathered to the rock shaft 15 and has a depending arm 19. A horizontal rod 20 is spherically jointed with the tool holder $g$ and with the arm 19, as seen clearly in Figures 5 and 10. At the moment when the cam 7 commences to actuate the roller 5 for the quick return, the arm 17 is pressed back by the cam face 14, the rock shaft 15 is turned and the sleeve 18, while sliding upon the shaft 15, also is turned and swings back the arm 19. The arm 19 pulls the rod 20 and the latter pulls back the tool holder $g$ around its pivot $h$. As will be seen from Figure 3, this retraction of the holder $g$ will be effected against the action of a compression spring 21. Therefore, as soon as the cam 14 ceases to operate the arm 17, the spring 21 will throw the tool holder $g$ forwards around its pivot $h$ for restoring the tool to cutting position.

The driving of the cams 6 and 7 will now be described. The main driving shaft $f$, Figures 1, 2 and 10, is carried forward so as to extend into the turret as seen in Figure 5. On the turret end of the shaft $f$ there is keyed a bevel gear 22 meshing with a bevel gear 23 which is revoluble around a stud 24 fixed centrally of the turret. The bevel 23 is formed in one with a pinion 25 which meshes with a pinion 26. The latter is formed in one with a bevel gear 27 which is a unit in a differential gear constituted by the bevel gears 27, 28, 29 and 29$^a$. This differential gear is provided for producing a compensating motion as hereinafter described, but for the present it may be regarded as merely transmitting motion from the gear 27 to the gear 28 and so to the bevel gear 30, which is secured to the spindle of the gear 28. The gear 30 drives a gear 31, the spindle 32 of which has fixed to it a pinion 33 meshing with a large transmission pinion 34 mounted on a stud 35 fixed in the turret head and upon which the pinion 34 revolves. The pinion 34 drives a smaller pinion 36 revolubly mounted on the pivot pin $n$ of the tool mounting $m$. The pinion 36 drives a pinion 37, Figures 4, 6 and 10, the latter being revoluble about a pin 38 fixed in a casing $t'$. The pinion 37 is fixed to, or formed in one with a bevel gear 39 forming a unit of a differential gear consisting of the bevel gears 39, 40, 41 and 41$^a$. This differential gear also is provided for the purpose of producing a compensating motion as hereinafter described, but for the present it may be regarded as merely transmitting motion from the pinion 37 to a pinion 42 formed on the same hollow spindle 43 as the bevel gear 40. The pinion 42 meshes with the teeth on the periphery of the disc 11, to which latter the cams 6, 7, are secured as aforesaid.

The turret head $p$, see Figures 4 and 5, has bolted to its under side a flanged ring 44, the flange of which takes beneath the top flange 45 of the turret base. A ring 46 of suitable anti-friction metal is mounted on the flange of the ring 44 for bearing against the top flange 45, and the inner periphery of the flange of the ring 44 is formed with teeth 47. As seen in Figures 4 and 10, the teeth of a pinion 48 mesh with the teeth 47, the pinion 48 being formed or fixed on a vertical spindle 49 which carries at its lower end a worm wheel 50. The worm 1 of the feed shaft $z$ already referred to with reference to Figure 1, drives the worm wheel 50.

Referring to Figures 4 and 10, it will be remembered that the rocking motion of the tool mounting $m$ about the pivot $n$ is controlled by the former $s$ which is engaged by the roller $r$. The carrier disc $u$ for the formers $s$ $s'$ referred to with reference to Figures 1 and 10, may be locked in the desired position by a locking pin 51 Figure 10. The bracket support $v$ for the disc $u$ is adjustable around the turret on a guide 52 and can be secured in the desired position by a clamping bolt 53.

It will be realized that it is important that the timing of the approach of the tool towards the blank should be the same for all teeth on the blank and should not be changed by any circular feed adjustment given to the turret head $p$ for causing the tool to take a cut more deeply between the teeth of the blank or by any rocking adjustment of the tool mounting $m$ by the former $s$ or $s'$ or for producing the shaping of such teeth. As the tool slide rest is reciprocated through the medium of a transmission comprising gears 23 and 25 situated on the centre of revolution of the turret head $p$ and a gear 36 situated on the centre of the pivot $n$ of the pivotal mounting $m$, it will be seen that, in the absence of compensating gearing, the circular adjustment of the turret head $p$, or the pivotal adjustment of the mounting $m$, cause a planetary motion of gears meshing with such central gears which would have the effect of altering the relative position of the cams 6 and 7 and therefore of the plate $l^2$ and the tool slide rest $j$, whereby the tool, after such adjustments, would cut a spiral along a different line from that intended.

The differential gearing 27, 28, 29 and 29ª above referred to is inserted, in order to compensate for the disturbing motion introduced by circular feed adjustment of the turret head. Referring to Figures 5 and 10, it will be seen that when the circular feed adjustment takes place, the pinion 26 is carried around the pinion 25. The latter, being held fast by its geared connection with the driving shaft $f$, causes the pinion 26 to roll and revolve, the motion of such revolution being transmitted through the gearing to the cams 6 and 7. Now, the planet wheels 29, 29ª of the differential are mounted on a cross pin 54 carried by a cage 55, and to the bottom of the latter there is fixed, by screws 56, a disc 57 which is capable of turning around the fixed stud 58. It may here be noted that the stud 58 serves for revolubly mounting the pinion 26 and bevel gear 27 and that the spindle 59 of the bevel gears 28 and 30 is mounted in the upper part of the cage 55 coaxially with the stud 58. The disc 57 is formed around a portion of its periphery with teeth 60 which mesh with a fixed pinion 61 on the fixed stud 24. Consequently as the turret head $p$ is circularly adjusted, the toothed disc 57 also will roll around the fixed pinion 61 and will turn the cage 55 causing the bevel gears 29, 29ª to roll on the bevel gear 27. If the pinions 25 and 26 have a 1:1 ratio and the disc 57 and the pinion 61 have a 2:1 ratio, the direction and extent of the rolling of the gears 29, 29ª due to the turning of the cage, is such as to nullify the motion due to the rolling of the pinion 26 around the pinion 25, as will be apparent to those skilled in the art. It may be mentioned with reference to Figure 5, that the stud 24 provides a centre bearing for a centre pin 62 of the turret head $p$, which latter is guided on the interior of the turret base by an internal flange 63.

The differential gearing 39, 40, 41, and 41ª, Figures 6 and 10, is inserted in order to compensate for the disturbing motion introduced by pivotal adjustment of the tool mounting $m$. Referring to Figures 4, 5 and 10, it will be realized that the transmission pinion 36 may be regarded as being held fast by its geared connection 34, 33, 31, 30, etc., with the driving shaft $f$. Consequently, when the mounting $m$ is pivotally adjusted about the pivot $n$, the pinion 37 will roll around the pinion 36 and the motion due to rolling will be transmitted through the gearing to the cams 6 and 7. Now, the planet wheels 41, 41ª of this differential are mounted on a cross pin 64 carried by a cage 65, Figure 6, formed with an end disc 66. The last named has teeth 67 formed around a portion of its periphery, and these teeth 67 mesh with teeth on a fixed pinion or segment 68 on the pivot $n$. The pinions 36 and 37 have a 1:1 ratio, and the disc 66 and segment 68 have a 2:1 ratio. Consequently, during pivotal adjustment of the mounting $m$, the toothed periphery 67 of the cage 65 also will roll on the fixed segment 68 and the turning of the cage will compensate for the disturbing motion introduced by the rolling of the pinion 37 around the pinion 36 in the same manner as has been described with reference to the differential gear 27, 28, 29 and 29ª.

Referring to Figures 7, 9, and 10 $y$ is the clutch already mentioned as being provided for the control of the feed shaft $z$. The clutch y is a grooved sleeve feathered on an extension of the shaft z and having clutch teeth on each end. The groove of the sleeve is engaged by a forked shifter 69 (see also Figure 11) which is clamped on a slidable rod 70. The clutch y is seen in Figures 7 and 9 in a rightward position in which it clutches with a sleeve 71 for the quick reverse driving of the feed shaft z as hereinafter described. In Figure 10, the clutch y is seen in the same position, only in this figure it is in a leftward position, as the view is from the rear. The clutch y may, however, be shifted in the manner hereinafter described, to a neutral position in which it has no clutching engagement, and it may be shifted to a leftward position and locked therein, as hereinafter described, in which position it clutches with a sleeve 72 for producing the intermittent feed of the turret head. The sleeve 72 is formed with a ring of ratchet teeth 73, Figures 7 to 10, adapted to be engaged by a pawl 74 pivotally mounted on a disc 75. The latter is connected by an adjustable rod 76 with one end of a lever 77 which swings about a pivot at its opposite end. A projection 78 on the lever 77 is adapted to be engaged from time to time by a striker 79 in order to depress the lever 77 and rod 76 for the purpose of causing the pawl 74 to feed round the ratchet 73 and thereby to produce circular feed of the turret when the clutch y is in the said leftward position. The striker 79 is fixed on the short spindle of a planet gear 80, which spindle is mounted in a bearing carried by the indexing wheel fixed on the work spindle a. The planet gear 80 is carried by the indexing wheel around a fixed gear 81 and, by choosing a suitable gearing ratio, the striker 79 at the end of every second revolution may be found in the position in which it is seen in Figure 8 and wherein it passes by the projection 78 without engaging the latter. At the end of the third and every alternate revolution thereafter, however, the striker 79 is found in the diametrically opposite position seen in Figure 10 in which it strikes the projection 78 as aforesaid. When it is required that the striker 79 should come to striking position at the end of every revolution, the gear ratio may be changed by substituting another satellite, or instead of altering the gear ratio, a second diametrically opposed striker may be arranged on the gear 80. The ratchet 73 may be partially encircled by an adjustable shield 82, seen in Figure 9, for regulating the extent of the feed by the pawl 74 in known manner. A suitable spring, not shown, would be connected with the lever 77 to return it to, and normally maintain it in, the position in which it is seen in Figure 8.

The clutch y is shifted to the leftward position in Figure 9, to clutch with the sleeve 72 by pulling out the rod 70 (see also Figures 10 and 11) by the knob 84, this movement compressing the spring 85 inserted between the shifter 69 and the fixed frame part 83. The clutch y must be locked in this leftward position by means now to be described. Around the rod 70 there is a sleeve 86 which is retained against the frame part 83 by a tongue device 87 secured by a screw to the part 83 and entering an arcuate groove in the sleeve 86 so as to permit the latter to rock. The sleeve 86 is formed with a projecting abutment 88, Figures 8, 10 and 11, designed to have a locking engagement with the shoulder 89 of a pin 90 carried by a sleeve 91 which can pivot on the rod 70 just behind the knob 84. Between the sleeves 91 and 86 there is a third sleeve 92 which is pinned to the rod 70 and performs a function hereinafter described. The sleeve 86 is formed also with a tooth 93 which normally lies in the path of a tooth 94 formed on a bent lever 95 which is pivoted at 96 to the disc 75 carrying the pawl 74. The curved lower edge of the free end portion of the lever 95 rides on a fixed pin 97, so that at every depression of the rod 76, and consequent turning of the disc 75, the tooth 94 will first engage the tooth 93 and turn the sleeve 86, but as the lever 95 rides up the fixed pin 97, the tooth 94 will be removed from engagement with the tooth 93. Thereupon a suitable spring, the fixing of one end of which is seen at 98 in Figure 9, will return the sleeve 86 to the normal position seen in Figures 8 and 9. The pin 90 is normally held by the sleeve 91 in such a position that the rocking of the sleeve 86 does not remove the abutment 88 from engagement with the shoulder 89 on the pin 90, as will be understood from Figure 11. The positioning of the sleeve 91 is controlled by an arm 99 thereon which is formed so as to be adapted to bear against the periphery of a disc 100, see Figures 8 to 11. A notch 101 is formed in the periphery of the disc 100 and at every revolution of the latter the extremity of the arm 99 enters the notch 101 and rocks the sleeve 91 slightly but to a sufficient extent for altering the relation between the shoulder 89 of the locking pin 90 and the abutment 88. Upon the next depression of the rod 76, the resultant turning of the sleeve 86 and its abutment 88 will free the latter from the shoulder 89 of the locking pin 90, so that the rod 70 is then free to be shifted by the spring 85 into the rightward position, in which it is seen in Figures 9 and 10, and to cause the clutch y to engage with the sleeve 71 which revolves in the reverse direction to the sleeve 72. Thus, if the notch 101 be so disposed as to be entered by the arm 99 when all the teeth of a blank have been completely machined on one side, the clutch $y$ will be thrown over to the rightward position so that the feed of the turret head ceases and a quick reverse feed restores the turret head to the initial position whereupon the clutch $y$ is adjusted to the neutral position as hereinafter described. Before describing the means for throwing the clutch $y$ into the neutral position, however, a description will be given of the mode of driving the feed devices above described.

The disc 100 is secured by bolts 102 to a disc 103, Figures 9 and 10, there being an undercut circular groove in the disc 103 in which the heads 104 of the bolts 102 are engaged, whereby the disc 100 may be circularly adjusted in relation with the disc 103 before tightening the nuts of the bolts 102 and securely clamping the discs 100 and 103 together. The two discs 100, 103 have central holes for mounting them upon the hub sleeve of a pinion 105, the said hub sleeve being revoluble about a stud or an axle pin 106 mounted on the fixed framing. The discs 100, 103 are kept in tight engagement with the face of the pinion 105 by means of a nut ring 107, which is screwed on to the end of the hub sleeve and is formed with peripheral notches for engagement with a key or spanner. The pinion 105 is kept in position on the stud 106, and against a suitable bearing face of the framing, by means of a nut 108 screwed on to the reduced end of the stud 106 and bearing against the end of the hub sleeve. A small pinion 109 is fixed on the extremity of the extension of the feed shaft $z$ and meshes with the pinion 105. When the clutch $y$, which is feathered to the extension of shaft $z$, is engaged with the sleeve 72 and the latter is fed round by the ratchet 73, the pinion 109 partakes of the revolution of the shaft $z$ and drives the pinion 105, the discs 100 and 103 turning with the latter. In this way, the notch 101 of the disc 100 is brought opposite the arm 99 for bringing about the throwing over of the clutch $y$ after a pre-determined number of revolutions of the feed shaft $z$.

The sleeve 71 is formed with a pinion 110 which meshes with an intermediate pinion 111, see Figures 8 and 9, and the latter meshes with a pinion 112 which is feathered on a counter-shaft 113 mounted in bearings in the fixed framing. The pinion 112 is thus slidable along the shaft 113 when the headstock is adjusted towards or from the turret. The countershaft 113 is driven from the main driving shaft $f$ by means of gears 114 and 115. In this way, motion is transmitted to the sleeve 71 from the main driving shaft $f$, and the direction of revolution of the sleeve 71 is opposite to that of the sleeve 72. Consequently, when the clutch $y$ is thrown into engagement with the sleeve 71, the feed shaft $z$ is reversely driven and turns the turret head back to the initial position. When the shaft $z$ reverses, the small pinion 109 thereon also reverses and drives the pinion 105 and the discs 100 and 103 reversely. At the moment that the turret head reaches the initial position, a striking plate 116, seen best in Figure 10, on the disc 103 engages an arm or projection 117 on the sleeve 92 which is pinned to the clutch shifter rod 70 and shifts the clutch $y$ out of engagement with the sleeve 71 and into a neutral position. At the commencement of the next cuttting operation on a blank, the parts above described must be re-set to suit requirements and the clutch $y$ must be engaged with the sleeve 72 and locked in such engagement as described, whereupon the intermittent feeding will again take place.

For driving the work spindle, and as seen in Figures 7, 8, and 10, the countershaft 113 has also feathered on it the hub sleeve of a bevel gear 118 meshing with a bevel gear 119 keyed on a spindle 120, see Figure 8$^b$. On the front end of the spindle 120 a pinion 121 is removably fixed by means of a nut device 143 as hereinafter described, and on the end of an upper transverse shaft 123 a pinion 124 is removably fixed as will be described. In Figures 8 and 9, 125 is a change gear carrier which is mounted to pivot about the stub shaft 120 and is adapted to be secured in desired positions by a fixing bolt 126 passing through an arcuate slot in the carrier 125. As will be seen from Figure 9, the carrier is adapted for the mounting of either one or two change gears between the pinions 124 and 121 as indicated by the chain lines at 127, Figures 1 and 8. The pinion 124 is keyed on the sleeve of a clutch member 128 and is clamped by the nut 124$^a$ against the shoulder of such clutch member 128. The latter is forced into engagement with its mate 129 by the screwing up of a nut 131 on the shaft 123. A spring 130 is disposed between these clutch members, so that when the nut 131 is slacked back, the clutch will be automatically opened by the spring 130 and the pinion drive will be cut out. The shaft 123 has a squared end 132 so that the work spindle may be turned by hand for adjusting the indexing wheel, by applying a suitable key to such end 132. The shaft 123 is fitted with a worm 133 for driving the worm wheel teeth of the indexing wheel 134 and so driving the work spindle $a$. The shaft 123 is fitted with suitable thrust bearing devices 135 and a grease box 136, as seen in Figure 8, but these parts require no detailed description.

The head stock is adjustable to and fro along the main framing in guides 137 seen in Figure 8. The traversing of the headstock along such guides is effected by suitable mechanism operated by a handle applied to the square spindle end 138 seen in Figure 8, but description of such traversing mechanism is not necessary for the purposes of this specification.

Referring again to the cams 6 and 7, Figures 3, 4, and 6, it may be noted that the spiral of the cam 7 which operates to produce the cutting stroke is a uniformly increasing spiral and that the arc through which it is operative is greater than that which corresponds with the traverse of the tool across the tooth face of the blank. By the use of such a cam, extreme accuracy in the endwise setting of the tool is not necessary when preparing for the cutting of a gear to mate with one which has just been cut because, no matter at what relative instant the cuts on the fresh blank are started, the reverse spiral struck on the mating gear in question will be of exactly the same character as that which has already been cut on its companion.

In connection with the cutting of long addendum teeth, it may be noted that there is a lengthening of the addendum of the pinion teeth and the corresponding shortening of the addendum of the gear tooth, the whole depth remaining the same as in the standard tooth. Means may be readily adapted for indexing the blank accurately when changing over from the cutting of one side of standard teeth to the cutting of the opposite sides. In the case of addendum teeth being cut, however, a different indexing is required, and this is provided for in the means now to be described.

As is seen best from Figure 8b, the front face of a flange on the spindle 120 is formed with a single tooth or projection 139. The front end of the spindle 120 is reduced and a sleeve 140 is passed on to this reduced end, the sleeve 140 being formed with a flange 141. In Figure 8b, the sleeve 140 is broken away to display the reduced end of the spindle 120. In the rear face of the flange 141 there are three radial notches or recesses 142, see also Figure 8a, any one of which may be engaged with the tooth or projection 139. The sleeve 140 is formed with a key groove 140a for keying the pinion 121, which is secured on the sleeve 140 by a nut 122 screwing on to the screw-threaded end of such sleeve. The sleeve 140 is secured on the reduced end of the solid spindle 120 by a milled nut 143 screwing on to the screw-threaded end of the solid spindle 120. Now when the machining of one of the sides of all the teeth of a blank is finished, it is necessary to turn the blank through the correct angle, so that the reverse tool, which is then inserted in the tool holder, shall come into operation accurately for the initial cut to be made on the other side of all the said teeth. Assume that standard teeth are to be cut, and assume also, that the middle one of the notches 142 is engaged with the single tooth 139. When the indexing of the blank is to take place, after machining one of the sides of all teeth of a blank, the milled nut 143 is slacked back and the middle one of the recesses 142 is withdrawn from engagement with the single tooth 139. A key is then applied to the squared end 132 of the shaft 123 which is now free to be turned by hand for indexing the blank. When the shaft 123 has been turned sufficiently to turn the flange 141 through a complete revolution, so that the middle one of the notches 142 can be re-engaged with the single tooth 139, the angle through which the blank has been turned is exactly that angle which is required for indexing the blank so that the reverse tool will make the initial cut accurately on the opposite side of all teeth. Naturally, the initial cut having been accurately started, all further cuts from the crown to the root of every tooth will follow automatically by the operation of the machine as above described. Assume, however, that a long or short addendum tooth is to be cut, instead of a standard tooth, then in indexing the blank as above described, the shaft 123 will be turned by hand so as to bring one or other of the side notches 142 into engagement with the single tooth 139, and the decreased or increased angle of turning required for this will be accurately suited to the increased or decreased addendum of the tooth to be cut, as will be readily understood. After any such indexing and the re-engaging of the notched flange 41, of course, the milled nut 143 must be tightened up to secure the parts in the new position of adjustment. It will be apparent that the flange 141 may be formed with more than three notches to suit different addenda, or that interchangeable sleeves 140 may be supplied each having a flange 141 formed with notches angularly disposed to suit different addenda.

It will be readily understood that the various mechanisms and details hereinbefore described can be modified and adapted for suiting various requirements without departing from the essential features of the invention as hereinbefore stated and as hereinafter claimed, the particular construction hereinbefore described with reference to the drawings being only one practical example of a machine adapted for cutting spiral bevel teeth in accordance with these improvements. In most cases, it will be advantageous not to do the rough cutting in a machine such as hereinbefore described, but to employ the machine for the accurate finishing of the teeth, as is customary in the art of cutting bevel and other teeth.

I claim:—

1. Spiral bevel gear cutting machine comprising means for continuously rotating the blank, a reciprocable tool slide, and a spiral cam adapted for driving said tool slide on its cutting stroke, the reciprocations of said slide being correlated to the speed of rotation of said blank substantially as set forth.

2. Spiral bevel gear cutting machine comprising means for continuously rotating the blank, a reciprocable tool slide, a cam of uniformly increasing spiral in driving engagement with said slide for imparting the cutting stroke thereto, return means operative on said slide, and driving means for said cam and said return means so correlated with the means for rotating said blank as to produce the desired degree of spiral on the teeth cut substantially as set forth.

3. Spiral bevel gear cutting machine comprising means for continuously rotating the blank, a reciprocable tool slide, a cam in driving engagement with said tool slide, said cam having a uniformly increasing spiral so proportioned as to produce a suitable overlap by the cutting stroke of the face to be cut, quick return means for said slide, and driving means for said cam and said return means so correlated with the means for rotating said blank as to produce the desired degree of spiral on the teeth cut substantially as set forth.

4. Spiral bevel gear cutting machine comprising means for continuously rotating the blank, a reciprocable tool slide, a cam of uniformly increasing spiral in operative relation with said slide for producing the cutting stroke thereof, a second cam in operative relation with said slide for producing the return stroke, and driving means for said cams so correlated with the driving means for said blank as to produce the desired degree of spiral on the teeth cut substantially as set forth.

5. Spiral bevel gear cutting machine comprising means for continuously rotating the blank, a reciprocable tool slide, a spiral cam in operative engagement with said slide for producing the cutting stroke thereof, a second cam in operative engagement with said slide for producing the return stroke thereof, said spiral cam being designed to produce an overlap by the cutting stroke of the face to be cut and said second cam being designed to produce a quick return of the slide, and driving means for said cams so correlated with the driving means for said blank as to produce the desired degree of spiral on the teeth cut substantially as set forth.

6. Spiral bevel gear cutting machine comprising means for continuously rotating the blank, a turret, a pivotal tool mounting on the turret, a tool slide guided in the mounting, a spiral cam in operative engagement with the tool slide for producing the cutting stroke thereof, a slide rest adjustable in guides in said slide, return means in operative engagement with said slide, driving means for said cam and said return means so correlated with the driving means for said blank as to produce the desired spiral on the teeth cut, feed mechanism operative on said slide, and a cam device operative on said pivotal mounting during feed to control the mounting for the shaping of the teeth substantially as set forth.

7. Spiral bevel gear cutting machine comprising means for continuously rotating the blank, a turret, a pivotal tool mounting on the turret, a tool slide guided in the mounting, a spiral cam in operative engagement with the tool slide for producing the cutting stroke thereof, a slide rest adjustable in guides in said slide, return means in operative engagement with said slide, feed mechanism operative to revolve said turret, a cam device operative on said pivotal mounting during feed for controlling the shaping of the teeth, and driving means for said spiral cam and said return means so correlated with the driving means for said blank as to produce the desired spiral on the teeth cut, said driving means comprising a gear on the axis of revolution of the turret and a gear on the pivotal axis of the mounting substantially as set forth.

8. Spiral bevel gear cutting machine comprising means for continuously rotating the blank, a turret, a pivotal tool mounting on the turret, a tool slide guided in the mounting, a spiral cam in operative engagement with the tool slide for producing the cutting strokes thereof, return means in operative engagement with said slide, feed mechanism operative to revolve the turret, a cam device operative on said pivotal mounting during feed for controlling shaping of the teeth, driving means for said cam and said return means so correlated with the driving means for said blank as to produce the desired spiral on the teeth cut, and a transmission between said driving means and said spiral cam and return means, said transmission comprising a compensating gear adjacent to the pivotal axis of the mounting whereby the pivotal adjustment of the mounting is prevented from altering the setting of the tool in relation with the blank substantially as set forth.

9. Spiral bevel gear cutting machine comprising means for continuously rotating the blank, a turret, a pivotal tool mounting on the turret, a tool slide guided in the mounting, a spiral cam in operative engagement with the tool slide for producing the cutting strokes thereof, return means in operative engagement with said slide, feed mechanism operative to revolve said turret, a cam operative on said pivotal mounting during feed for controlling shaping of the teeth, driving means for said cam and said return means so correlated with the driving means for said blank as to produce the desired spiral on the teeth cut, and a transmission between said driving means and said cam and return means, said transmission comprising a compensating gear adjacent to the pivotal axis of the mounting, and a compensating gear adjacent to the axis of revolution of the turret whereby the pivotal adjustment of the mounting and the circular feed of said turret are prevented from altering the relation of the tool with the blank substantially as set forth.

10. In a spiral bevel gear cutting machine in which the blank is constantly and uniformly rotated and the tool is constantly reciprocated through the medium of cam mechanism, a turret pivotally supporting the reciprocatory tool slide, a circular feed for said turret, and a transmission between a driving means and the tool slide and comprising a gear on the axis of the turret, and a compensating mechanism meshing with said gear whereby circular feed motions of the turret are prevented from altering the relation of the tool with the blank substantially as set forth.

11. In a spiral bevel gear cutting machine in which the blank is constantly and uniformly rotated and the tool is constantly reciprocated through the medium of cam mechanism, a turret pivotally supporting the reciprocatory tool slide, a circular feed for said turret, a transmission between a driving means and the tool slide and comprising a gear on the axis of revolution of the turret and a gear on the pivotal axis of the slide-supporting means, and differential compensating mechanisms meshing with said gears whereby circular feed motions of said turret and pivotal motions of said slide-supporting means are prevented from altering the relation of the tool with the blank substantially as set forth.

12. In a bevel gear cutting machine in which the blank is constantly and uniformly rotated and the tool is constantly reciprocated through the medium of cam mechanism, a turret pivotally supporting the reciprocatory tool slide, a circular feed for said turret, a transmission between a driving means and the tool slide and comprising a gear on the axis of revolution of the turret and a gear on the pivotal axis of the slide-supporting means, said gears driving respective differential gears in said transmission, fixed gears on the axis of revolution of said turret and on the pivotal axis of said slide-supporting means respectively, and gears connected with the cages of said differential gears and meshing with respective fixed gears at the said axis substantially as and for the purpose set forth.

13. Spiral bevel gear cutting machine comprising a work spindle, means for continuously rotating said work spindle, a turret, a pivotal tool mounting on the turret, a tool slide guided in the mounting, a spiral cam in operative engagement with the tool slide for producing the cutting strokes thereof, return means in operative engagement with said slide, feed mechanism operative to revolve said turret, a cam operative on said pivotal mounting during feed for controlling shaping of the teeth, a transmission mechanism for conveying power to said cam and said return means, said transmission comprising a compensating gear adjacent to the pivotal axis of the mounting and a compensating gear adjacent to the axis of revolution of the turret whereby the pivotal adjustment of the mounting and the circular feed of the turret are prevented from altering the relation of the tool with the blank substantially as set forth.

14. Spiral bevel gear cutting machine comprising a work spindle, an indexing wheel associated with said spindle, means for continuously rotating said work spindle, a turret, a pivotal tool mounting on the turret, a tool slide guided in the mounting, a spiral cam in operative engagement with the tool slide for producing the cutting strokes thereof, return means in operative engagement with said slide, feed mechanism operative to revolve said turret, said feed mechanism comprising a pawl and ratchet mechanism operated by a striker carried by said indexing wheel, a cam operative on said pivotal mounting during feed for controlling shaping of the teeth, a transmission mechanism for conveying power to said cam and return means, said transmission comprising a compensating gear adjacent to the pivotal axis of the mounting and a compensating gear adjacent to the axis of revolution of the turret whereby the pivotal adjustment of the mounting and the circular feed of the turret are prevented from altering the relation of the tool with the blank, and means operatively interconnecting said work spindle and said transmission substantially as set forth.

15. Spiral bevel gear cutting machine comprising a work spindle, an indexing wheel associated with said spindle, means for continuously rotating said work spindle, a turret, a pivotal tool mounting on the turret, a tool slide guided in the mounting, a spiral cam in operative engagement with the tool slide for producing the cutting strokes thereof, return means in operative engagement with said slide, feed mechanism operative to revolve said turret, said feed mechanism comprising a ratchet and pawl mechanism, lever mechanism connected with said pawl, a sun gear fixed coaxially with said indexing wheel, a planet gear carried by said indexing wheel and meshing with said sun wheel, a striker fixed to said planet gear and adapted for operating said lever mechanism for causing said pawl to feed said ratchet the frequency of operation of said striker being dependent upon the ratio between the planet gear and sun gear, a cam operative upon said pivotal mounting during feed for controlling shaping of the teeth, a transmission mechanism for conveying power to said spiral cam and return means, said transmission comprising a compensating gear adjacent to the pivotal axis of the mounting and a compensating gear adjacent to the axis of revolution of the turret whereby the pivotal adjustment of the mounting and the circular feed of the turret are prevented from altering the relation of the tool with the blank, and means operatively interconnecting said work spindle and said transmission substantially as set forth.

16. In a spiral bevel gear cutting machine in which the blank is constantly and uniformly rotated and the tool is constantly reciprocated through the medium of cam mechanism, a turret pivotally supporting the reciprocatory tool slide, a circular feed mechanism operatively connected with said turret, a transmission between a driving means and the tool slide and comprising a gear on the axis of the turret and a gear on the pivotal axis of the slide-supporting means, differential compensating mechanisms meshing with said gears whereby circular feed motions of the turret and pivotal motions of said slide-supporting means are prevented from altering the relation of the tool with the blank, a feed shaft for driving said feed mechanism, an intermittently operated pawl and ratchet mechanism between the work spindle and the feed shaft, a reversible clutch normally connecting said feed shaft with said pawl and ratchet mechanism, power driven means normally free of said clutch, and means driven by said feed shaft and adapted for reversing said clutch to disengage the same from said pawl and ratchet mechanism and engage it with said power driven means substantially as set forth.

17. In a spiral bevel gear cutting machine in which the blank is constantly and uniformly rotated and the tool is constantly reciprocated through the medium of cam mechanism, a turret pivotally supporting the reciprocatory tool slide, a circular feed mechanism operatively connected with the said turret, a transmission between a driving means and the tool slide and comprising a gear on the axis of the turret and a gear on the pivotal axis of the tool-supporting means, differential compensating mechanisms meshing with said gears whereby circular feed motions of the turret and pivotal motions of said slide-supporting means are prevented from altering the relation of the tool with the blank, a feed shaft for driving said feed mechanism, an intermittently operated pawl and ratchet mechanism between the work spindle and the feed shaft, a reversible clutch normally connecting said feed shaft with said pawl and ratchet mechanism, power driven means normally free of said clutch, means driven by said feed shaft and adapted for reversing said clutch to disengage the same from said pawl and ratchet mechanism and engage it with said power driven means, and means driven by said feed shaft and adapted for shifting said clutch to a neutral position subsequently to said reversal substantially as set forth.

18. In a spiral bevel gear cutting machine in which the blank is constantly and uniformly rotated and the tool is constantly reciprocated through the medium of cam mechanism, a turret pivotally supporting the reciprocatory tool slide, a circular feed mechanism operatively connected with the said turret, a transmission between a driving means and the tool slide and comprising a gear on the axis of the turret and a gear on the pivotal axis of the tool-supporting means, differential compensating mechanism meshing with said gears whereby circular feed motions of said turret and pivotal motions of said slide-supporting means are prevented from altering the relation of the tool with the blank, an indexing wheel associated with the work spindle, an auxiliary indexing disc gear with said indexing wheel, and adjustable clutching means between said indexing wheel and said auxiliary indexing disc and adapted for clutching the said disc in any one of several definite positions for correctly indexing the blank for the cutting of opposite sides of teeth having different addenda substantially as set forth.

19. Spiral bevel gear cutting machine comprising a constantly and uniformly driven work spindle, a reciprocatory cutter slide, a pivotal mounting for said slide, a turret, a pivot on said turret for supporting said mounting, a cam spindle in said mounting, a uniformly increasing spiral cam on said cam spindle adapted for driving said slide along the cutting stroke said cam being operative for more than one half of a revolution of said cam spindle, a second cam on said cam spindle adapted for returning said slide said second cam being operative for less than one half of a revolution of said cam spindle, and a transmission mechanism between the work spindle and the said cam spindle said transmission mechanism comprising gears at the axis of revolution of said cutter and at the axis of pivotal adjustment of said mounting substantially as set forth.

ALBERT RATH.